(12) United States Patent
Mendel et al.

(10) Patent No.: US 8,488,729 B1
(45) Date of Patent: Jul. 16, 2013

(54) DESKEW ACROSS HIGH SPEED DATA LANES

(75) Inventors: David W. Mendel, Sunnyvale, CA (US); Brent A. Fairbanks, San Jose, CA (US); Ning Xue, Fremont, CA (US)

(73) Assignee: Altera Corporation, San Jose, CA (US)

( * ) Notice: Subject to any disclaimer, the term of this patent is extended or adjusted under 35 U.S.C. 154(b) by 384 days.

(21) Appl. No.: 12/879,706

(22) Filed: Sep. 10, 2010

(51) Int. Cl.
*H04L 7/00* (2006.01)

(52) U.S. Cl.
USPC .......................... 375/354; 375/371; 380/251

(58) Field of Classification Search
USPC ................ 375/259–260, 354, 355, 367, 372, 375/371; 380/287, 255
See application file for complete search history.

(56) References Cited

U.S. PATENT DOCUMENTS

| | | | | |
|---|---|---|---|---|
| 6,766,464 | B2* | 7/2004 | Collier | 713/503 |
| 6,876,696 | B1* | 4/2005 | Goodson et al. | 375/219 |
| 7,225,354 | B2* | 5/2007 | Tseng | 713/503 |
| 7,346,798 | B2* | 3/2008 | Tseng | 713/500 |
| 7,434,114 | B2* | 10/2008 | Jang et al. | 714/700 |
| 7,500,131 | B2* | 3/2009 | Panikkar et al. | 713/503 |
| 7,760,836 | B2* | 7/2010 | Haas et al. | 375/367 |
| 7,839,966 | B1* | 11/2010 | Masepohl | 375/371 |
| 7,995,696 | B1* | 8/2011 | Norrie | 375/372 |
| 2005/0141661 | A1* | 6/2005 | Renaud et al. | 375/372 |
| 2006/0280274 | A1* | 12/2006 | Okuyama | 375/372 |

OTHER PUBLICATIONS

U.S. Appl. No. 12/632,744, filed Dec. 7, 2009, Vijayaraghavan et al.
Glass, et al. System Packet Interface Level 5 (SPI-5): OC-768 System Interface for Physical and Link Layer Devices, 2001, pp. 1-75, The Optical Internetworking Forum (OIF).

\* cited by examiner

*Primary Examiner* — Jean B Corrielus
(74) *Attorney, Agent, or Firm* — Mauriel Kapouytian & Treffert LLP; Michael Mauriel (57) ABSTRACT

Methods and structures are disclosed for aligning high speed data across a plurality of lanes. In one embodiment, a method and integrated circuit ("IC") is provided for receiving and aligning scrambled training data across a plurality of data lanes before the data is descrambled. In some implementations, a known scrambled training pattern is different in each lane and alignment includes comparing incoming training data in each lane to different known scrambled training patterns in each lane. In some implementations, after scrambled data is aligned and then descrambled, it is checked against a known unscrambled training pattern to make sure that alignment of the scrambled training data was correct. In an alternative embodiment, data is descrambled before being aligned, but deskew circuitry output is monitored to determine if a training pattern ends at the same time across the plurality of lanes being aligned. If not, then data in a lane for which the training pattern ends earliest is delayed by an amount corresponding to the length of one or more cycles of the training pattern.

20 Claims, 8 Drawing Sheets

DESKEW ACROSS HIGH SPEED DATA LANES

BACKGROUND

This invention relates generally to system interconnect technology. Multi-lane communications provide one method of providing high speed communications between integrated circuit ("IC") devices. Some applications require significant distance between transmit and receive systems. For example, a cell phone tower requires communications between tower and base systems. In such applications, the problem of skew from one lane to another can become particularly significant. Also, as communications happen at higher data rates, ever smaller amounts of skew can exceed a clock cycle and therefore cause data errors. Typically data is aligned across multiple lanes using test data that includes what is sometimes referred to as a training pattern or training sequence. A typical training pattern will include several logical high ("1") values followed and/or preceded by several logical low ("0") values. For example, the SPI-5 specification provides for a training pattern of 16 low values followed by 16 high values (or as stated in the specification, eight words of "00" followed by eight words of "11"). This produces a long square wave and alignment is typically done by aligning an edge of the square wave across all lanes. This may be accomplished with deskew FIFOs, delay chains, or other known circuitry that can be configured to apply different amounts of set delay on each lane. So, for example, if lanes 0 and 2 arrive together but two clock cycles ahead of lanes 1 and 3, FIFOs in lanes 0 and 2 can be configured to introduce two clocks of delay on those lanes relative to lanes 1 and 3 to align the data. Once the training data has been used to align data across multiple lanes, then regular data can be sent and it will be aligned properly aligned by the receiving device.

However, there are certain disadvantages to using training patterns to align data. For example, if the amount of skew exceeds the length of a training pattern cycle, then it is possible that aligning data with an edge of a square wave will actually misalign the data by some multiple (e.g., 1, 2, 3, etc.) of the training pattern's cycle length. Given the amount of skew that can be introduced in high speed communications, particularly if done over a significant distance, even a 32 bit training pattern (as referenced above in the context of SPI-5) can be too short for the amount of skew that might be introduced in a particular application. Therefore, new methods and structures for handling skew are needed.

SUMMARY

In one embodiment, a method and integrated circuit ("IC") is provided for receiving and aligning scrambled training data across a plurality of data lanes before the data is descrambled. In some implementations, a known scrambled training pattern is different in each lane and alignment includes comparing incoming scrambled training data in each lane to different known scrambled training patterns in each lane. In some implementations, after scrambled data is aligned and then descrambled, it is checked against a known unscrambled training pattern to make sure that alignment of the scrambled training data was correct. In an alternative embodiment, data is descrambled before being aligned, but deskew circuitry output is monitored to determine if a training pattern ends at the same time across the plurality of lanes being aligned. If not, then data in a lane for which the training pattern ends earliest is delayed by an amount corresponding to the length of one or more cycles of the training pattern.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
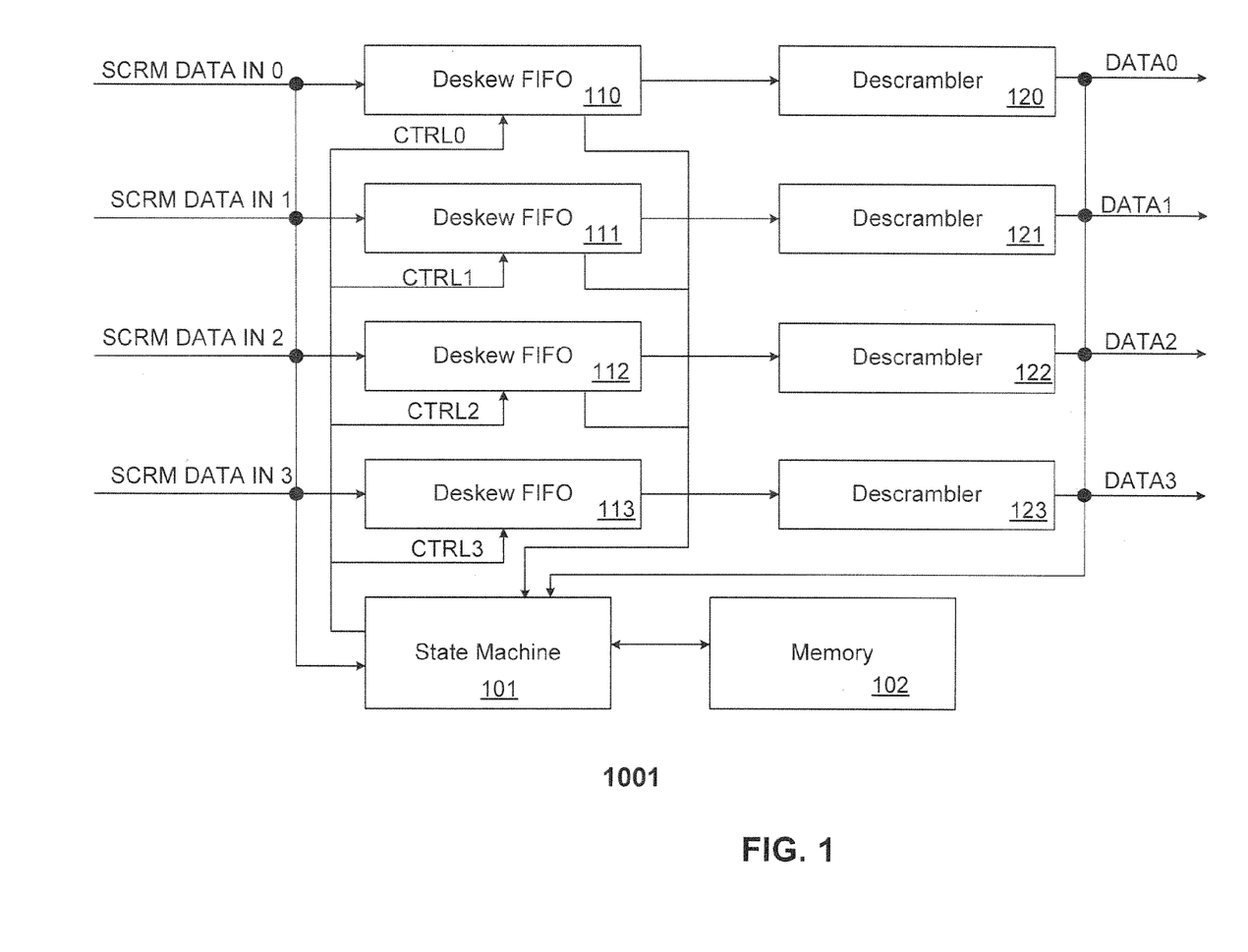
FIG. 1 illustrates receive circuitry in accordance with an embodiment of the invention.

FIG. 1 illustrates receive circuitry 1001 in accordance with an embodiment of the invention. For purposes of illustration and ease of explanation only, FIG. 1 illustrates four exemplary data lanes. Those skilled in the art will appreciate that the principles of the present invention apply equally well to examples with any number of two or more data lanes that need to be aligned.

Receive circuitry 1001 includes deskew first-in-first-out circuits ("FIFOs") 110, 111, 112, and 113; descrambler circuitry 120, 121, 122, 123, state machine 101 and memory 102. Deskew FIFOs 110, 111, 112, and 113 are coupled to receive respective scrambled data signals SCRM DATA IN 0, SCRM DATA IN 1, SCRM DATA IN 2, and SCRM DATA IN 3. Sate machine 101 is coupled to monitor deskew FIFOs 110, 111, 112, and 113 and is also coupled to provide the deskew FIFOs with respective control signals CTRL0, CTRL1, CTRL2, and CTRL3. Descramblers 120, 121, 122, and 123 are coupled to receive output from, respectively, deskew FIFOs 110, 111, 112, and 113 and to provide respective descrambled output signals DATA0, DATA1, DATA2, and DATA3. As those skilled in the art will understand, the term "scrambler" circuitry is also often used to reference circuitry that can be used to scramble or descramble data.

State machine 101 is also coupled as shown to monitor signals SCRM DATA IN 0, SCRM DATA IN 1, SCRM DATA IN 2, and SCRM DATA IN 3 and to access memory 102 and compare those signals to one or more known scrambled training patterns stored in memory 102. State machine 101 monitors deskew FIFOs 110, 111, 112, and 113 so that it can determine when alignment points of the incoming scrambled data signals are at respective read locations of the deskew FIFOs. In the illustrated embodiment, memory 102 is on the same IC as the rest of receive circuitry 1001. However, in alternative embodiments, known patterns of scrambled training data may be stored off chip. In other alternative embodiments, such patterns may not be stored in memory but rather may be computed as needed from known scrambling keys and known unscrambled training data patterns. In some implementations, the incoming scrambled training data has been scrambled using a different key for each lane. In such implementations, state machine 101 will access a different known scrambled training data pattern for each lane. In other implementations, the incoming scrambled training data has been scrambled using the same key for each lane and the same known scrambled training pattern can be accessed for each lane.

It will be appreciated by those skilled in the art that "known pattern" of scrambled training data may just refer to a portion of a pattern of scrambled training data. Although a full non-repeating cycle of scrambled training data might be, for example, 64K bits long, a particular smaller sequence of bits within that cycle might be unique and non-repeating such that a pattern much shorter than 64K bits can be used to match against incoming scrambled training data for alignment purposes. Therefore, the known training pattern stored in memory 102 might be shorter than a full cycle of known scrambled training data. In one example, a 16-bit length linear feedback shift register ("LFSR") implementing a particular scrambling polynomial might generate a scrambled training data sequence that is 64K bits long which is evolved from an unscrambled training pattern that is 16 bits long. In that case, a known pattern of scrambled training data that is 16 bits long (e.g. the first 16 bits) can be used for purposes of aligning incoming scrambled training data. However, in other examples, the pattern used for matching may be more or less than the length of the LSFR generating the scrambled data. This is further illustrated and described in the context of FIGS. 3a-3c. Typically, a pattern in scrambled training data will repeat much less frequently than will a pattern in unscrambled training data. Thus alignment using a pattern of scrambled data can succeed even with relatively large amounts of skew. In other words, the threshold amount of skew that risks an alignment being off by a full cycle of the pattern is much larger when a typical scrambled training pattern is used than when a typical unscrambled training pattern is used.

Continuing with the description of FIG. 1, state machine 101 is also coupled to monitor descrambled data signals DATA0, DATA1, DATA2, and DATA3. As will be further described in the context of FIG. 2, this allows state machine 101 to compare those signals to a known pattern of unscrambled training data to perform a double check confirming that alignment of scrambled training data has been done properly.

Figure 2:
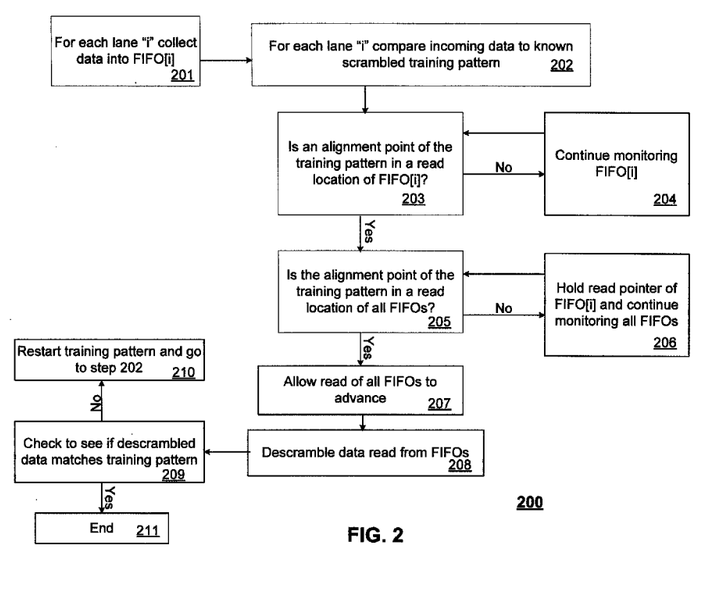
FIG. 2 is a flow diagram illustrating a method in accordance with an embodiment of the invention.

FIG. 2 illustrates a method 200 in accordance with an embodiment of the invention. Certain steps illustrated in method 200 may be implemented in a particular embodiment by state machine 101 of FIG. 1. At step 201, for each lane "i" of a plurality of lanes, training data is collected into a FIFO[i] for that lane. At steps 202-203, incoming data in a FIFO[i] for each lane i is compared to a known scrambled training pattern and it is determined whether an alignment point of the incoming training pattern is at a read location of FIFO[i] for a particular lane i. An "alignment point" of the data simply means a designated bit in a known series of bits used for alignment (or, in the case of multi-bit wide lanes, a set of parallel data in a series of parallel sets of data). It may or may not be a first bit (or a first set of bits) in a known sequence. Step 203 determines whether that alignment point has reached a location of a read pointer for the relevant FIFO. Those skilled in the art will appreciate that in alternative embodiments, other locations within a FIFO may be used as designated locations for determining whether an alignment point of the data has reached the designated locations. In a preferred embodiment, the designated location will be selected relative to a location of a read pointer which, as those skilled in the art will appreciate, may change from one clock cycle to the next if the read pointer is being allowed to advance. This will be further explained in the context of FIGS. 3a-3c.

Continuing with the description of FIG. 2, if at step 203 it is determined that an alignment point for lane i has not reached the designated location in FIFO[i] (in this example, a read location), then the method proceeds to step 204 and continues to monitor FIFO[i] and repeat step 203. If at step 203 it is determined that an alignment point for lane i has reached a read location of FIFO[i], then the method proceeds to step 205 to determine whether an alignment point for each other lane has reached read locations in corresponding FIFOs in those lanes. If no, then the method proceeds to step 206 and the read pointer for FIFO[i] is held while the method continues to monitor all other FIFOs and repeat step 205. If the result of step 205 is yes, then the method proceeds to step 207 and the read of all FIFOs is allowed to advance (e.g., by allowing read pointers for each FIFO to resume advancing on each clock).

At step 208, the data read from each FIFO is descrambled. At step 209, the method determines whether the descrambled data matches an unscrambled training pattern. If yes, then the method proceeds to step 211 and the data is declared aligned. If no, then the method proceeds to step 210 and the method restarts at step 201 to attempt again to align scrambled training data.

Figure 3A:
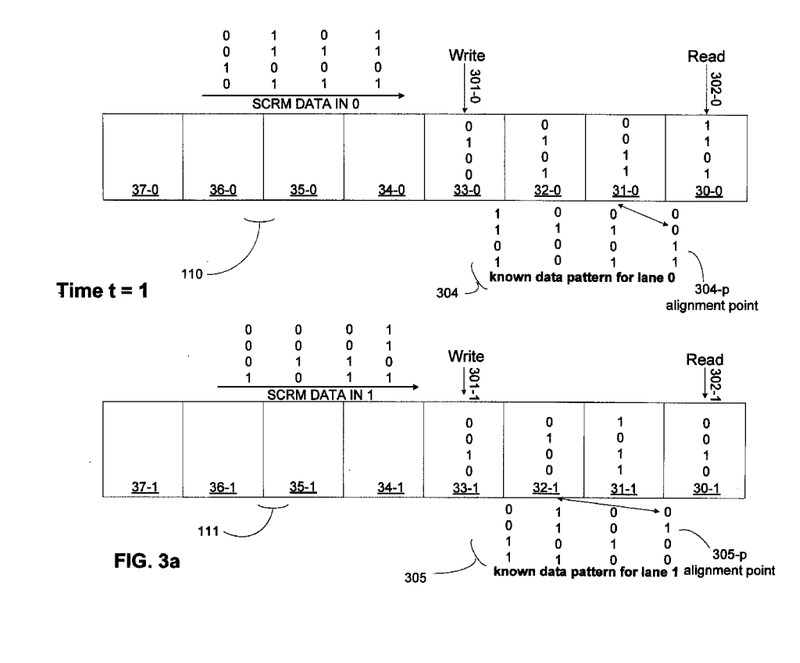
FIGS. 3a-3c illustrate a simplified example showing alignment of scrambled training data across two different lanes referenced in FIG. 1.
Figure 3B:
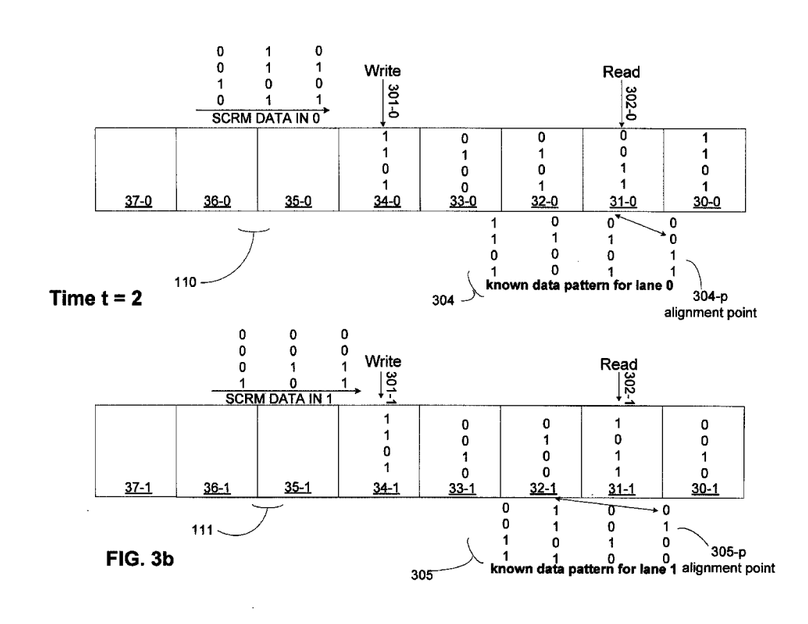
Figure 3C:
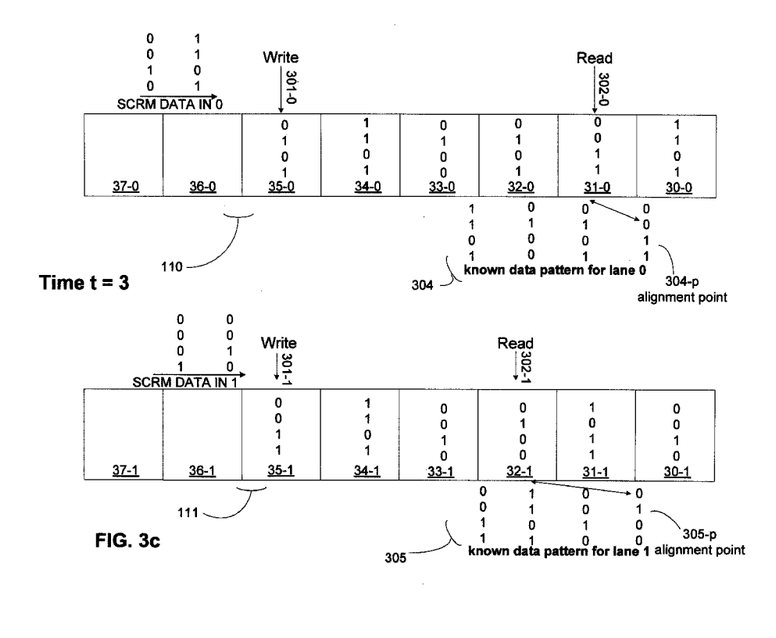

FIGS. 3a-3c illustrate a simplified example showing alignment of data across two circular FIFOs in two different lanes, specifically, FIFO 110 in lane 0 and FIFO 111 in lane 1 of FIG. 1. As those skilled in the art will appreciate, the representation of data and FIFOs in FIGS. 3a-3c is highly abstracted and simplified for purposes of illustrating underlying principles of an embodiment of the present invention. Scrambled training data and associated patterns in an actual implementation would likely be significantly longer and more complex. Moreover, the illustrations assume that each FIFO handles parallel data that is 4-bits wide (and that each scrambled data stream is 4-bits wide in a particular lane). An actual implementation might handle data of different widths. In this example, the data has already been word aligned and deserialized within each lane before reaching the illustrated deskew FIFOs, but has not yet been deskewed across the illustrated lanes.

FIG. 3a represents the state of FIFOs 110 and 111 at a first time t=1. The represented portion of FIFO 110 includes memory locations, 30-0, 31-0, 32-0, 33-0, 34-0, 35-0, 36-0, and 37-0. The represented portion of FIFO 111 includes memory locations 30-1, 31-1, 32-1, 33-1, 34-1, 35-1, 36-1, and 37-1. FIFO 110 has a write pointer 301-0 that is currently pointing to location 33-0 such that incoming data is currently being written to that location and a read pointer 302-0 that is currently pointing to location 30-0 such that data is currently being read from that location. Similarly, FIFO 111 has a write pointer 301-1 that is currently pointing to location 33-1 such that incoming data is currently being written to that location and a read pointer 302-1 that is currently pointing to location 30-1 such that data is currently being read from that location.

The signal SCRM DATA IN 0 is providing data to FIFO 110 in lane 0. As illustrated, the following sets of parallel data values been written into respective locations 33-0, 32-0, 31-0 and 30-0:

| | | | |
|---|---|---|---|
| 0 | 0 | 0 | 1 |
| 1 | 1 | 0 | 1 |
| 0 | 0 | 1 | 0 |
| 0 | 1 | 1 | 1 |

The remaining the incoming data of SCRM DATA IN 0 to be written to FIFO 110 on upcoming clock cycles includes the following sets of parallel data:

| | | | |
|---|---|---|---|
| 0 | 1 | 0 | 1 |
| 0 | 1 | 1 | 1 |
| 1 | 0 | 0 | 0 |
| 0 | 1 | 1 | 1 |

The signal SCRM DATA IN 1 is providing data to FIFO 111 in lane 1. As illustrated, the following sets of parallel data values been written into respective locations 33-1, 32-1, 31-1 and 30-1:

| | | | |
|---|---|---|---|
| 0 | 0 | 1 | 0 |
| 0 | 1 | 0 | 0 |
| 1 | 0 | 1 | 1 |
| 0 | 0 | 1 | 0 |

The remaining the incoming data of SCRM DATA IN 1 to be written to FIFO 111 on upcoming clock cycles includes the following sets of parallel data:

| | | | |
|---|---|---|---|
| 0 | 0 | 0 | 1 |
| 0 | 0 | 0 | 1 |
| 0 | 1 | 1 | 0 |
| 1 | 0 | 1 | 1 |

Also represented in FIG. 3*a* are known data patterns 304 and 305 for, respectively, lane 0 and lane 1. Data pattern 304 includes the following sets of parallel data:

| | | | |
|---|---|---|---|
| 1 | 0 | 0 | 0 |
| 1 | 1 | 1 | 0 |
| 0 | 0 | 0 | 1 |
| 1 | 0 | 1 | 1 |

The right most set (from top to bottom: 0011) represents an alignment point 304-*p* that will be used to determine when an alignment point has reached a designated location in FIFO 110. By looking at the data from SCRM DATA IN 0, one can see that the data matches pattern 304 starting with the 4-bit parallel set (values 0011) currently in location 31-0 and ending with the parallel set (values 1101) from SCRM DATA IN 1 to be written into the FIFO on a second subsequent clock cycle. Assuming that in this example, alignment is determined with respect to whether an alignment point is at a read location of a FIFO, one can see that the data (values 0011) in location 31-0 corresponding to alignment point 304-*p* is not yet at a read location of FIFO 110, but would be on the next clock cycle if read pointer 302-0 advances.

Data pattern 305 (for lane 1) includes the following sets of parallel data:

| | | | |
|---|---|---|---|
| 0 | 1 | 1 | 0 |
| 0 | 1 | 0 | 1 |
| 1 | 0 | 1 | 0 |
| 1 | 1 | 1 | 0 |

The right most set (from top to bottom: 0100) represents an alignment point 305-*p* that will be used to determine when an alignment point has reached a designated location in FIFO 111. By looking at the data from SCRM DATA IN 1, one can see that the data matches pattern 305 starting with the 4-bit parallel set (values 0100) currently in location 32-1 and ending with the parallel set (values 0011) from SCRM DATA IN 1 to be written into the FIFO on a second subsequent clock cycle.

Assuming that, in this example, alignment is determined with respect to whether an alignment point is at a read location of a FIFO, one can see that the data (values 0100 in location 32-1 corresponding to alignment point 304-*p* is not yet at a read location of FIFO 111, but would be on the second subsequent clock cycle if read pointer 302-1 advances on each clock cycle.

FIG. 3*b* illustrates the state of FIFOs 110 and 111 at a next time t=2. At time t=2, the read and write pointers have all advanced one location in FIFOs 110 and 111. Specifically, in FIFO 110, write pointer 301-0 has now advanced to location 34-0 and the parallel set (values 1101) from SCRM DATA IN 0 that was next to be written (see FIG. 3*a*) has now been written in location 34-0. Read pointer 302-0 has advanced to location 31-0 so that the parallel set (values 0011) in that location is now read out of FIFO 110. Based on a comparison with known data pattern 304, one can see that the set (values 0011) in location 31-0 corresponding to alignment point 304-*p* of that data pattern is now at a read location of FIFO 110.

Looking at FIFO 111, write pointer 301-1 has now advanced to location 34-1 and the set (values 1101) from SCRM DATA IN 1 that was next to be written (see FIG. 3*a*) has now been written in location 34-1. Read pointer 302-1 has advanced to location 31-1 so that the data set (values 1011) in that location is now read out of FIFO 110. Based on comparison with known data pattern 305, on can see that the data set (values 0100) in location 32-1 corresponding to alignment point 305-*p* is not yet at a read location of FIFO 111, but would be on the next clock cycle if read pointer 302-1 advances.

A system applying method 200 of FIG. 2 to the state of FIFOs 110 and 111 presented in FIG. 3*b* would have determined that in lane 0 a data alignment point has reached a read location of FIFO 110 but that a data alignment point has not yet reached a read location on FIFO 111 in lane 1. Therefore, read pointer 302-0 for FIFO 110 would be held and the system would continue monitoring FIFO 111 in lane 1 to determine when an alignment point of data in that lane reaches a read location in FIFO 111.

FIG. 3*c* illustrates the state of FIFOs 110 and 111 at a next time t=3. At time t=3, in FIFO 110, write pointer 301-0 has now advanced to location 34-0 and the data set (values 0101) from SCRM DATA IN 0 that was next to be written (see FIG. 3*b*) has now been written in location 35-0. Read pointer 302-0 has been held at location 31-0 so that the data set (values 0011) in that location is still read out of FIFO 110. Read pointer 302-0 remains at that location because that location holds the data corresponding to alignment point 304-$p$ in known scrambled training pattern 304.

Looking at FIFO 111, write pointer 301-1 has now advanced to location 35-1 and the data set (values 0011) from SCRM DATA IN 1 that was next to be written (see FIG. 3$b$) has now been written in location 35-1. Read pointer 302-1 has advanced to location 32-1 so that the data set (values 0100) in that location is now read out of FIFO 110. Based on a comparison with known data pattern 305, one can see that the data set (values 0100) in location 32-1 corresponds to alignment point 305-$p$ of known scrambled data pattern 305.

Because data corresponding to alignment points in the known scrambled data patterns for each lane illustrated in FIG. 3$c$ have reached read locations in FIFOs 110 and 111, the lanes may be said to be aligned and read and write pointers can advance regularly. Note, however, that it may be desirable to require the added confirmation of alignment described by steps 208 and 209 of method 200 in FIG. 2. In those steps, the preliminarily aligned scrambled training data would be descrambled to confirm that it matches the unscrambled known training pattern.

Note that in FIG. 3$c$, the training data is said to be aligned even though the data is different in each lane. The reason is that the scrambled training pattern is different in each lane. Those skilled in the art will appreciate that it may be desirable in some implementations to use a different scrambling key for each lane. In such cases, even if the unscrambled training pattern is the same in each lane, the scrambled training pattern is different in each lane. Thus, in such implementations, accomplishing alignment on scrambled training data requires comparison of data in each lane to a different known scrambled training pattern.

Figure 4:
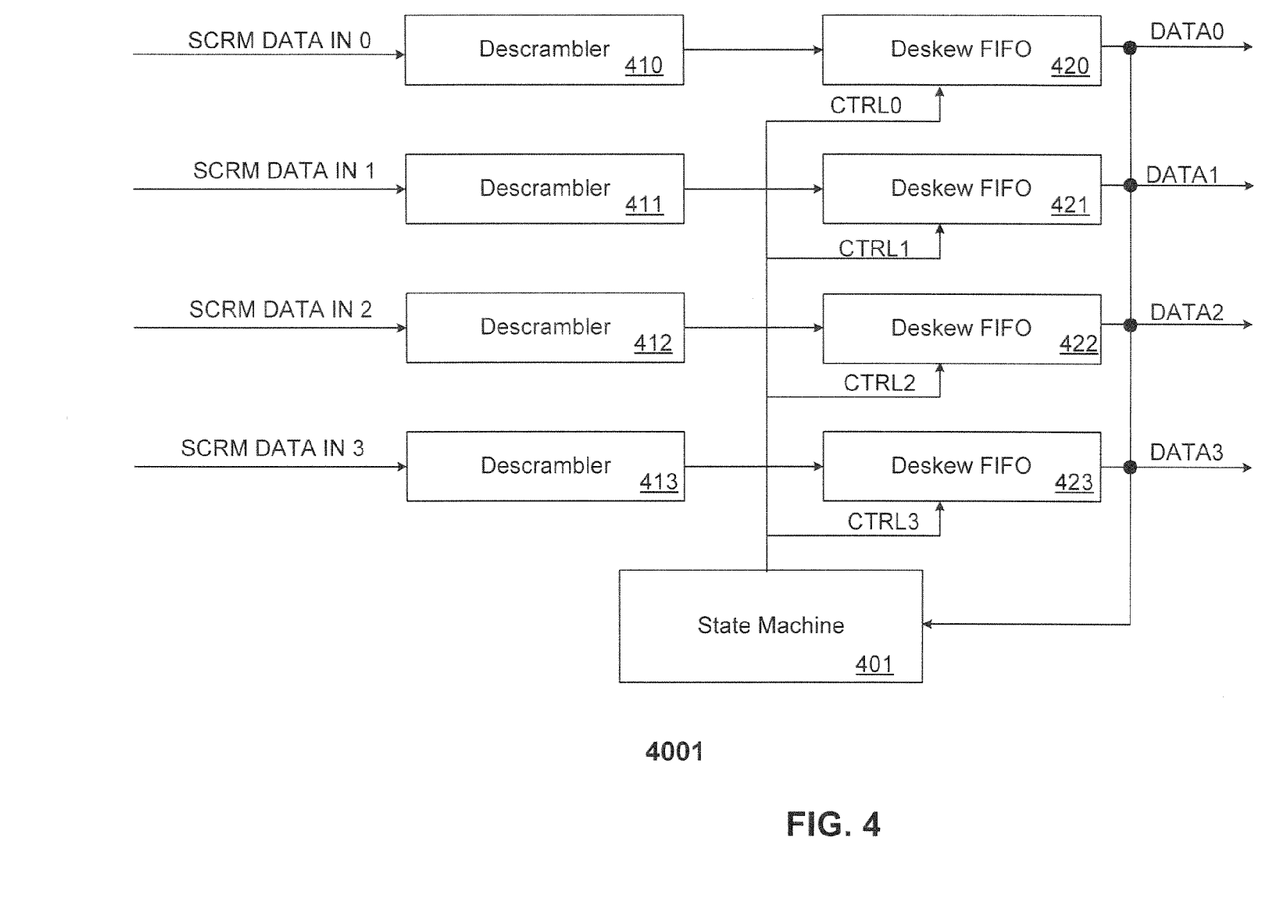
FIG. 4 illustrates receive circuitry in accordance with another embodiment of the invention.

FIG. 4 illustrates receive circuitry 4001 in accordance with another embodiment of the invention. For purposes of illustration and ease of explanation only, FIG. 4 illustrates four exemplary data lanes. Those skilled in the art will appreciate that the principles of the present invention apply equally well to examples with any number of two or more data lanes that need to be aligned.

Receive circuitry 4001 includes descrambler circuitry 410, 411, 412, and 413; deskew FIFOs 420, 421, 422, 423 and state machine 401. Descramblers 410, 411, 412, and 413 are coupled to receive respective scrambled data signals SCRM DATA IN 0, SCRM DATA IN 1, SCRM DATA IN 2, and SCRM DATA IN 3. Sate Machine 401 is coupled to monitor deskew FIFOs 410, 411, 412, and 413 and is also coupled to provide the deskew FIFOs with respective control signals CTRL0, CTRL1, CTRL2, and CTRL3. Deskew FIFOs 420, 421, 422, and 423 are coupled to receive output from, respectively, descramblers 410, 411, 412, and 413 and to provide respective output signals DATA0, DATA1, DATA2, and DATA3. As will be further described in the context of FIG. 4, state machine 401 controls the deskew FIFOs 420, 421, 422, 423 to preliminarily align unscrambled training data, confirms whether the alignment was successful by looking at whether the training patterns ends at the same time in each lane and, if necessary, makes a delay adjustment to achieve alignment.

Figure 5:
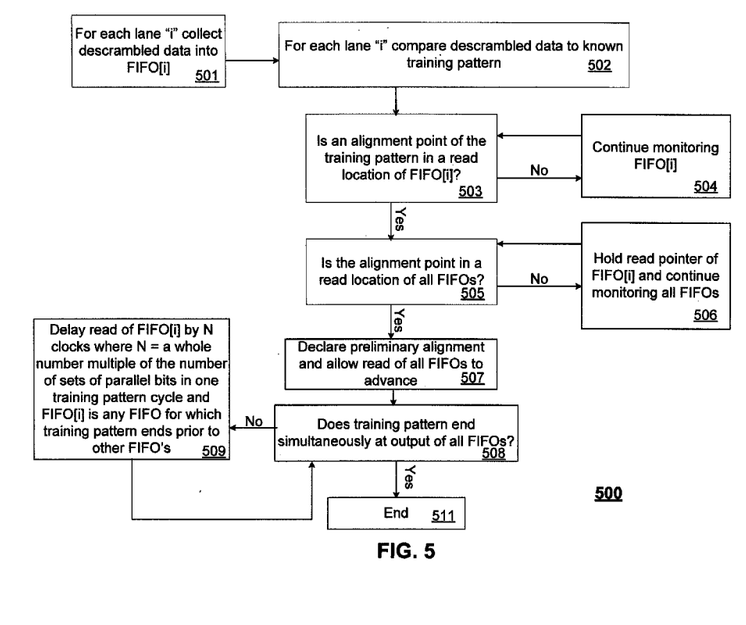
FIG. 5 is a flow diagram illustrating a method in accordance with another embodiment of the invention.

FIG. 5 illustrates a method 500 in accordance with an embodiment of the invention. Certain steps illustrated in method 500 may be implemented in a particular embodiment by state machine 401 of FIG. 4. At step 501, for each lane "i" of a plurality of lanes, training data is collected into a FIFO[i] for that lane. At steps 502-503, incoming data in a FIFO[i] for each lane i is compared to a known unscrambled training pattern and it is determined whether an alignment point of the incoming training pattern is at a read location of FIFO[i] for a particular lane i. If at step 503 it is determined that an alignment point for lane i has not reached the designated location in FIFO[i](in this example, a read location), then the method proceeds to step 504 and continues to monitor FIFO[i] and repeat step 503. If at step 503 it is determined that an alignment point for lane i has reached a read location of FIFO[i], then the method proceeds to step 505 to determine whether an alignment point for each other lane has reached read locations in corresponding FIFOs in those lanes. If no, then the method proceeds to step 506 and the read pointer for FIFO[i] is held while the method continues to monitor all other FIFOs and repeat step 505. If yes, then the method proceeds to step 507 and the read of all FIFOs is allowed to advance (e.g., by allowing the read pointer to resume advancing on each clock cycle). At step 507, the data is considered tentatively aligned pending the results of step 508 as further described below.

Step 508 determines whether the known unscrambled training pattern ends simultaneously at the output of each FIFO. This step is necessary when data rates are high and training patterns are such that it might be possible for data to be misaligned by an amount greater than the length of a whole cycle of the training pattern. For example, a commonly used training pattern comprises 16 low values "0s" followed by 16 high values "1s". In a typical alignment technique, the transition edge from low to high is used as an alignment point to align the data across the lanes. Such a technique works if the skew across the lanes is less than the number of parallelized sets of bits in a full cycle of the training pattern (assuming the data in each lane has already been word aligned and parallelized). However, if the skew is greater, such a technique may result in misalignment by one or more cycles of the training pattern. If no such misalignment has occurred, then the training pattern will end at the same time across the output of all FIFOs, the result of step 508 will be "yes," and the method ends at step 511. However, if such misalignment has occurred, then the result of step 508 will be "no" and the method proceeds to step 509. Step 509 determines which FIFO[i] has reached the end of the training pattern prior to other FIFOs. For that FIFO[i], data is delayed by N clocks where N is a whole number multiple of the number bits in a full cycle of the training pattern divided by the FIFO data width, or, in other words, the number of parallel sets of bits in one cycle of such a known training pattern (assuming the incoming training pattern has been converted to parallel data). In one embodiment, N is initially 1. After delaying data in FIFO[i] by a length of one training pattern cycle, the method returns to step 508 to determine if now the end of the training pattern has been reached for all FIFOs including FIFO[i]. If no, i.e., if alignment has not been achieved using N=1, then the method returns to step 509 and N is incremented to 2 and so on until alignment is achieved. In one embodiment, if the alignment is not reach by the time N reaches a predetermined value, then the method restarts at step 501.

Receive circuitry 1001 in FIG. 1, receive circuitry 4001 in FIG. 4 (or, receive circuitry in accordance with alternative embodiments of the invention), may be provided as part of a transceiver in an IC. Some ICs, including programmable logic devices (PLDs), have at least portions that support configuration. PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways. Such configuration may be accomplished via data stored in programmable elements on the PLD. Programmable elements may include dynamic or static RAM, flip-flops, electronically erasable programmable read-only memory (EEPROM) cells, flash, fuse, anti-fuse programmable connections, or other memory elements. Configuration may also be accomplished via one or more externally generated signals received by the PLD during operation of the PLD. Data represented by such signals may or may not be stored on the PLD during operation of the PLD. Configuration may also be accomplished via mask programming during fabrication of the PLD. While mask programming may have disadvantages relative to some of the field programmable options already listed, it may be useful in certain high volume applications.

Figure 6:
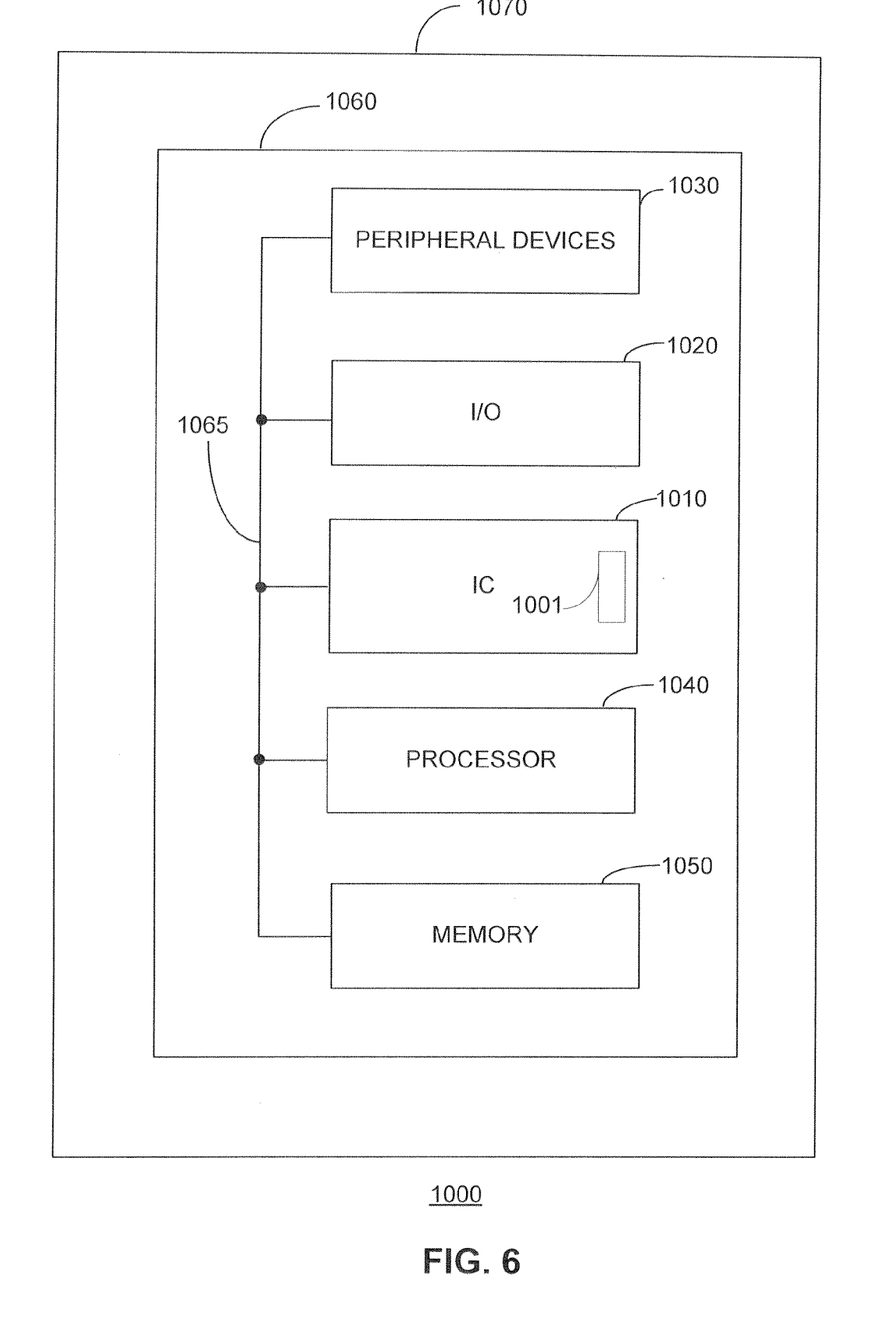
FIG. 6 illustrates an exemplary data processing system including an integrated circuit ("IC"), the IC including a transceiver that includes receive circuitry in accordance with an embodiment of the present invention.

FIG. 6 illustrates an exemplary data processing system 1000 including IC 1010. IC includes transceiver 1001 and transceiver 1001 includes receive circuitry in accordance with an embodiment of the present invention. For ease of illustration, only a single transceiver is shown, however, a IC such as IC 1010 may include multiple transceivers such as transceiver 1001.

Data processing system 1000 may include one or more of the following additional components: processor 1040, memory 1050, input/output (I/O) circuitry 1020, and peripheral devices 1030 and/or other components. These components are coupled together by system bus 1065 and are populated on circuit board 1060 which is contained in end-user system 1070. A data processing system such as system 1000 may include a single end-user system such as end-user system 1070 or may include a plurality of systems working together as a data processing system.

System 1000 can be used in a wide variety of applications, such as computer networking, data networking, instrumentation, video processing, and digital signal processing, for example. IC 1010 can be used to perform a variety of different logic functions. In some alternative embodiments, IC 1010 might (but not necessarily) be a PLD. In such alternatives, IC 1010 can be configured as a processor or controller that works in cooperation with processor 1040 (or, in alternative embodiments, a PLD might itself act as the sole system processor). IC 1010 may also be used as an arbiter for arbitrating access to shared resources in system 1000. In yet another example, IC 1010 might be configured as an interface between processor 1040 and one of the other components in system 1000. It should be noted that system 1000 is only exemplary.

In one embodiment, system 1000 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. A method of multi-lane data communications comprising:
    receiving scrambled training data on an integrated circuit ("IC") in each of a plurality of lanes; and
    aligning the scrambled training data across the plurality of lanes using a known pattern of scrambled training data, wherein aligning comprises delaying data in a lane for which a data alignment point of the known pattern has reached a designated register until corresponding alignment points for data in other lanes are at corresponding designated registers in those other lanes.

2. The method of claim 1 wherein the known pattern of scrambled training data includes different known patterns of scrambled training data for each of the plurality of lanes.

3. The method of claim 1, wherein aligning determines preliminary alignment, the method further comprising confirming alignment by descrambling preliminarily aligned training data for each of the plurality of lanes and determining whether descrambled training data matches a known pattern of descrambled training data.

4. The method of claim 3 wherein if descrambled preliminarily aligned training data for each of the plurality of lanes does not match the known pattern of descrambled training data, the method is repeated.

5. The method of claim 1 wherein, for each lane, the designated register is a memory element at a read location of a first-in-first-out circuit ("FIFO").

6. Receive circuitry in an integrated circuit ("IC") adapted for multi-lane data communication comprising:
    deskew circuitry in each of a plurality of data lanes;
    descrambler circuitry in each of the plurality of data lanes coupled to receive and descramble data from the deskew circuitry; and
    state machine circuitry adaptable to control the deskew circuitry to align scrambled data received by the IC across the plurality of data lanes prior to the data being descrambled by the descrambler circuitry.

7. The receive circuitry of claim 6 wherein the state machine circuitry is adaptable to control the deskew circuitry by:
    monitoring incoming scrambled training data received by the deskew circuitry;
    using a known pattern of scrambled training data to determine whether an alignment point of the received scrambled training data has reached a designated register of the deskew circuitry; and
    delaying the received scrambled data in the deskew circuitry of the particular lane until corresponding alignment points of received scrambled training data in all other lanes have reached corresponding designated registers of corresponding deskew circuitry in all other lanes.

8. The receiver of claim 6 wherein, for each lane, the designated register is a memory element at a read location of a first-in-first-out circuit ("FIFO").

9. The receive circuitry of claim 6 wherein the state machine circuit is adaptable to determine whether descrambled data output by the descrambler circuitry matches a known pattern of descrambled training data.

10. An integrated circuit ("IC") comprising the receive circuitry of claim 6.

11. A data processing system comprising the IC of claim 10.

12. A method of multi-lane data communications comprising:
    receiving scrambled training data on an integrated circuit ("IC") in each of a plurality of lanes;
    descrambling the training data;
    aligning descrambled training data to an alignment point of a known pattern of descrambled training data;
    determining if an end of the training data reaches designated registers in all of the plurality of lanes on a same clock cycle; and
    if the end of the training data does not reach designated registers in all of the plurality of lanes on the same clock cycle, delaying data by a length of the known pattern of descrambled training data in any lane for which the end of the training data reached a designated register prior to other lanes.

13. The method of claim 12 further comprising after delaying data by a length of the known pattern of descrambled training data, if the end of the training pattern is still not at designated registers in all of the plurality of lanes on a same clock cycle, delaying data again by a length of the known pattern of descrambled training data in any lane for which the end of the training data reached a designated register prior to other lanes.

14. The method of claim 12 wherein aligning comprises:
   for a particular lane, using a known pattern of descrambled training data to determine whether an alignment point of the received and descrambled training data has reached a designated register;
   determining whether corresponding alignment points for descrambled training data in all other lanes have reached corresponding designated registers; and
   if corresponding alignment points for descrambled training data in all other lanes have not reached corresponding designated registers, delaying data for the particular lane.

15. The method of claim 12 wherein alignment points for descrambled training data are a middle transition of the known pattern of descrambled training data.

16. The method of claim 12 wherein, for each lane, the designated register is a memory element at a read location of a first-in-first-out circuit ("FIFO").

17. Receive circuitry in an integrated circuit ("IC") adapted for multi-lane data communication comprising:
   descrambler circuitry in each of the plurality of data lanes coupled to receive and descramble data;
   deskew circuitry in each of a plurality of data lanes coupled to receive descrambled data; and
   state machine circuitry adaptable to control the deskew circuitry to align training data received by the IC across the plurality of data lanes by:
   aligning the training data at an alignment point of a known pattern of the training data;
   determining whether an end of the training data is aligned across the plurality of lanes; and
   if the end of the training data does not reach designated registers in all of the plurality of lanes on the same clock cycle, delaying data by a length of the known pattern of descrambled training data in any lane for which the end of the training data reached the receive circuitry prior to other lanes.

18. The receive circuitry of claim 17 wherein the state machine is adaptable to align the training data at an alignment point of a known pattern of the training data by:
   for a particular lane, using a known pattern of descrambled training data to determine whether an alignment point of the received and descrambled training data has reached a designated register;
   determining whether corresponding alignment points for descrambled training data in all other lanes have reached corresponding designated registers; and
   if corresponding alignment points for descrambled training data in all other lanes have not reached corresponding designated registers, delaying data for the particular lane.

19. An integrated circuit ("IC") comprising the receive circuitry of claim 17.

20. A data processing system comprising the IC of claim 19.

* * * * *